US012528084B2

(12) United States Patent
Hunt et al.

(10) Patent No.: US 12,528,084 B2
(45) Date of Patent: Jan. 20, 2026

(54) CONTAINER AND CAP ASSEMBLY FOR CRYOGENIC STORAGE

(71) Applicants: SiO2 Medical Products, LLC, Auburn, AL (US); Sanaria Inc., Rockville, NY (US)

(72) Inventors: Benjamin Hunt, Auburn, AL (US); Chase Bryan Jackson, Auburn, AL (US); Eric R. James, Rockville, NY (US)

(73) Assignees: SiO2 Medical Products, LLC, Auburn, AL (US); Sanaria Inc., Rockville, NY (US)

( * ) Notice: Subject to any disclaimer, the term of this patent is extended or adjusted under 35 U.S.C. 154(b) by 1196 days.

(21) Appl. No.: 17/309,723

(22) PCT Filed: Dec. 17, 2019

(86) PCT No.: PCT/US2019/066685

§ 371 (c)(1),
(2) Date: Jun. 16, 2021

(87) PCT Pub. No.: WO2020/231474

PCT Pub. Date: Nov. 19, 2020

(65) Prior Publication Data

US 2022/0016622 A1 Jan. 20, 2022

Related U.S. Application Data

(60) Provisional application No. 62/780,395, filed on Dec. 17, 2018.

(51) Int. Cl.
*B01L 3/00* (2006.01)

(52) U.S. Cl.
CPC ..... *B01L 3/50825* (2013.01); *B01L 2300/042* (2013.01); *B01L 2300/044* (2013.01); *B01L 2300/0858* (2013.01)

(58) Field of Classification Search
CPC ........... B01L 3/50825; B01L 2300/042; B01L 2300/044; B01L 2300/0858; A01N 1/145; A01N 1/147
See application file for complete search history.

(56) References Cited

U.S. PATENT DOCUMENTS 4,652,429 A * 3/1987 Konrad ................ B65D 51/002 422/550
7,985,188 B2 7/2011 Felts et al.
(Continued)

FOREIGN PATENT DOCUMENTS

EP 0150172 A2 7/1985
EP 1923136 A1 5/2008
(Continued)

*Primary Examiner* — Matthew D Krcha
*Assistant Examiner* — Austin Q Le
(74) *Attorney, Agent, or Firm* — David B. Gornish; Eckert Seamans Cherin & Mellott LLC

(57) ABSTRACT

Disclosed are container and cap assemblies for cryogenic storage of materials at temperatures below negative 150° C. The container and cap assemblies disclosed maintain container closure integrity and fluid-tightness at ambient and cryogenic temperatures, optionally to preserve biologically active substances stored therein.

20 Claims, 8 Drawing Sheets

(56) References Cited

U.S. PATENT DOCUMENTS

| | | | | |
|---|---|---|---|---|
| 2007/0246468 | A1* | 10/2007 | Miller | B01L 3/50825 215/296 |
| 2008/0116204 | A1* | 5/2008 | Ohse | B01L 3/50825 220/254.6 |
| 2013/0291632 | A1 | 11/2013 | Felts et al. | |
| 2014/0318282 | A1* | 10/2014 | Blekher | A61B 5/150351 73/864.91 |
| 2015/0335823 | A1* | 11/2015 | Weikart | C23C 16/045 427/547 |
| 2019/0092555 | A1* | 3/2019 | Ma | B65D 81/3823 |

FOREIGN PATENT DOCUMENTS

| | | | |
|---|---|---|---|
| EP | 2251452 | A2 | 11/2010 |
| GB | 2407314 | A | 4/2005 |
| WO | 2017177120 | A1 | 10/2017 |

* cited by examiner

CONTAINER AND CAP ASSEMBLY FOR CRYOGENIC STORAGE

CROSS-REFERENCE TO RELATED APPLICATIONS

The present application is a U.S. National Phase Application of International Application No. PCT/US2019/066685, entitled "CONTAINER AND CAP ASSEMBLY FOR CRYOGENIC STORAGE," filed Dec. 17, 2019, which claims priority to U.S. Provisional Patent Application No. 62/780,395, filed on Dec. 17, 2018, the contents of each being incorporated herein by reference in their entirety.

STATEMENT OF GOVERNMENT INTEREST

Without any prejudice or admission, the invention and work defined herein was paid for in part by funding from the Navy Contract #W911QY17C0064, and the U.S. Government may have certain rights deriving therefrom.

BACKGROUND OF THE INVENTION

1. Field of Invention

The disclosed concept relates generally to packaging of materials subjected to cryogenic cooling. More particularly, the disclosed concept relates to container assemblies that provide adequate closure integrity and preserve sterility for, e.g., biological substances such as human or animal cells, under cryogenic conditions.

2. Description of Related Art

Cryopreservation is a process in which biological substances, such as human or animal cells, which are susceptible to degradation and decomposition, are preserved by cooling to extremely low temperatures. Some substances may be cooled to and maintained at temperatures of −80° C. to achieve the desired shelf life stability. Other substances require cooling and storage below the glass point of aqueous solutions to achieve desired shelf life stability, typically to temperatures below −150° C., which typically involve liquid nitrogen vapor phase (LNVP).

Conventional vials for cryopreservation have screw caps, with internal or external threads on the vial body and with an elastomeric gasket or O-ring for forming a seal between the cap and the vial. This type of seal maintains container closure integrity down to −80° C. However, as the vial is cooled down to LNVP temperatures, the elastomer loses its elasticity and contracts to a greater extent than the plastic that is generally used to make the vial. As a result, the junction between the cap and the vial, which is fluid tight at ambient temperatures and gas tight down to temperatures of −80° C., is no longer fluid tight when cooled down to LNVP temperatures.

Externally threaded screw cap cryovials, which do not include an elastomeric gasket and which have a plastic-to-plastic vial and cap junction, have been shown to exhibit much better closure integrity. However, the container closure is still not entirely fluid tight. During storage, gas will enter the vial due to the reduced internal pressure produced by cooling from ambient to LNVP temperatures. Such cooling will reduce the pressure of the interior of the vial from 1 atm to below 0.5 atm. A vial that has undergone pressure equalization during storage at LNVP temperatures as a result of gas ingress may have an internal pressure above 2 atm after thawing.

There thus is a strong need for container and cap assemblies that overcome the aforementioned deficiencies.

SUMMARY OF THE INVENTION

Accordingly, a container and cap assembly is provided. The container and cap assembly includes a container body having a base and sidewall extending therefrom. The container body defines an interior configured for storing a substance. The container body further has an opening leading to the interior, the interior comprising a body sealing surface that is optionally provided on an interior portion of the sidewall. The container and cap assembly further includes a cap configured for insertion into the opening so as to provide fluid-tight closure between the cap and the container body at ambient temperatures. The cap has an outer surface that comprises a cap sealing surface configured to engage in an interference fit and optionally a snap-fit with the body sealing surface when the cap is inserted into the opening. The cap includes a first section formed of a first material adapted to be pierceable by conventional hypodermic needles and a second section formed of a second material that is adapted to not be pierceable by conventional hypodermic needles. The first section and the second section together form an assembled unit, wherein the first section forms a first portion of the cap sealing surface and the second section forms a second portion of the cap sealing surface.

Optionally, in any embodiment, the body sealing surface and cap sealing surface are generally round.

Optionally, in any embodiment, the first material is elastomeric, optionally a thermoplastic elastomer or silicone rubber.

Optionally, in any embodiment, the second material is made from an injection moldable thermoplastic resin, optionally a polyolefin such as polypropylene, polyethylene, cyclic olefin polymer or cyclic olefin copolymer.

Optionally, in any embodiment, the cap is made through a two-shot injection molding process, wherein a first material shot injects the first material within a mold and a second material shot injects the second material shot within the mold to form the assembled unit as a unitary structure upon cooling of the assembled unit.

Optionally, in any embodiment, the assembly has a foil seal disposed over the opening, fully enclosing the cap within the container body beneath the foil seal, the foil seal providing a hermetic closure over the opening. Optionally, the foil seal is heat annealed to an upper surface of the container body surrounding the opening.

Optionally, in any embodiment, the second section includes an annular ring. Optionally, the annular ring includes at least one bead and the body sealing surface includes at least one groove, the at least one bead of the annular ring being configured to engage the at least one groove of the body sealing surface so as to form a snap fit engagement therebetween. Optionally, the annular ring includes an axially projecting annular extension having an outer diameter that is less than that of the second portion of the cap sealing surface. Optionally, the first section has a central core for piercing with a hypodermic needle in order to withdraw therewith a substance stored within the interior of the container body. Optionally, the first section comprising an inner portion disposed along an inside of the extension and an outer portion disposed on an outside of the extension. Optionally, the outer portion of the first section comprises at least one bead and the body sealing surface comprises at least one groove, the at least one bead of the outer portion configured to engage the at least one groove of the body sealing surface so as to form a sealing engagement therebetween. Optionally, the first section extends axially beyond the axially projecting annular extension.

Optionally, in any embodiment, the cap has a top portion that includes the first section and the second section, the cap having a bottom portion that consists only of the first section (and none of the second section).

Optionally, in any embodiment, the cap is inserted into the opening so as to provide a fluid-tight closure between the cap and the container body. The first portion of the cap sealing surface provides a sealing engagement with the body sealing surface. The second portion of the cap sealing surface provides a snap-fit engagement with the body sealing surface.

Optionally, in any embodiment, a bioactive substance is stored within the interior of the body. Optionally, the bioactive substance includes live cells or a vaccine.

Optionally, in any embodiment, the cap does not include a component that engages an outer portion of the container body. The entirety of the cap is optionally disposed within the container body.

Optionally, in any embodiment, the container body is made from one or more injection moldable thermoplastic resins including one or more of the following: an olefin polymer; polypropylene (PP); polyethylene (PE); cyclic olefin copolymer (COC); cyclic olefin polymer (COP); polymethylpentene; polyester; polyethylene terephthalate; polyethylene naphthalate; polybutylene terephthalate (PBT); PVdC (polyvinylidene chloride); polyvinyl chloride (PVC); polycarbonate; polymethylmethacrylate; polylactic acid; polystyrene; hydrogenated polystyrene; poly(cyclohexylethylene) (PCHE); nylon; polyurethane polyacrylonitrile; polyacrylonitrile (PAN); an ionomeric resin; and Surlyn® ionomeric resin.

Optionally, in any embodiment, the sidewall of the body has an interior wall having at least one plasma enhanced chemical deposition (PECVD) coating. The PECVD coating optionally includes one of the following: (a) a single organosiloxane layer disposed on the interior wall; or (b) a tri-layer coating, optionally including a tie layer disposed on the interior wall, an SiOx barrier layer disposed on the tie layer and an organo-siloxane layer disposed on the SiOx barrier layer.

In an optional aspect of the disclosed concept, the container and cap assembly may be used to store a bioactive substance within the interior of the body. Optionally, the bioactive substance is cell material or a vaccine. The container and cap assembly maintains container closure integrity (CCI) under preferably all conditions of temperature from ambient and including cryogenic conditions at temperatures below −150° C.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF PREFERRED EMBODIMENTS OF THE INVENTION

Figure 1:
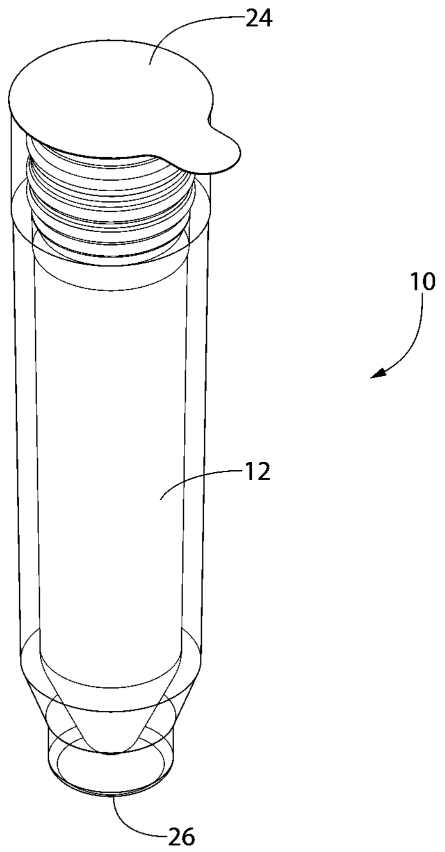
FIG. 1 is an isometric view of a sealed container and cap assembly according to an aspect of the disclosed concept.
Figure 2:
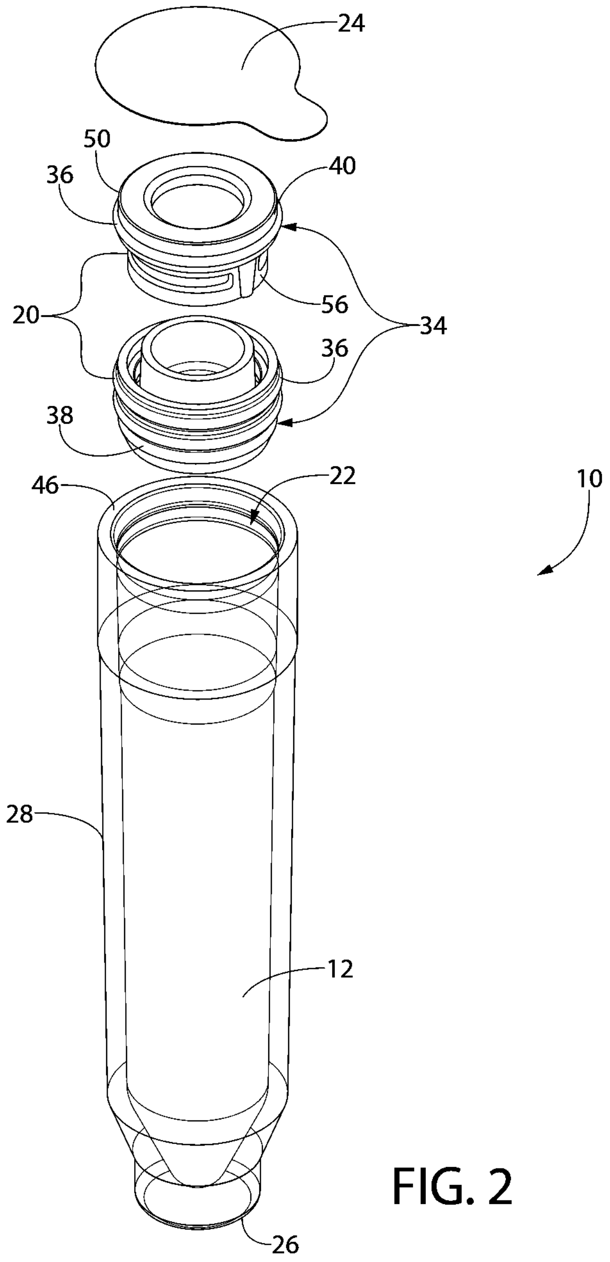
FIG. 2 is an exploded perspective view of the container and cap assembly of FIG. 1.
Figure 3:
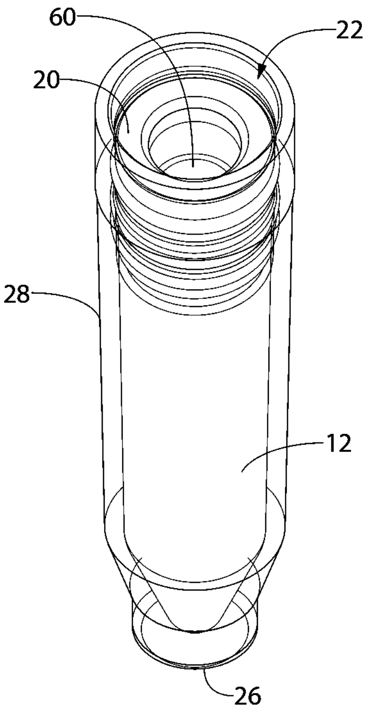
FIG. 3 is another isometric view of the container and cap assembly of FIG. 1 without the foil seal disposed thereon, so as to illustrate the top of the cap.

The disclosed concept will now be described more fully with reference to the accompanying drawings, in which several embodiments are shown. This invention may, however, be embodied in many different forms and should not be construed as limited to the embodiments set forth here. Rather, these embodiments are examples of the invention, which has the full scope indicated by the language of the claims. Like numbers refer to like elements throughout. Unless indicated otherwise, the features characterizing the embodiments and aspects described in the following may be combined with each other, and the resulting combinations are also embodiments of the present invention.

Definitions

As used in this disclosure, an "organosilicon precursor" is a compound having at least one of the linkages:

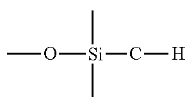

or

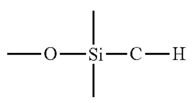

which is a tetravalent silicon atom connected to an oxygen or nitrogen atom and an organic carbon atom (an organic carbon atom being a carbon atom bonded to at least one hydrogen atom). A volatile organosilicon precursor, defined as such a precursor that can be supplied as a vapor in a plasma enhanced chemical vapor deposition (PECVD) apparatus, is an optional organosilicon precursor. Optionally, the organosilicon precursor is selected from the group consisting of a linear siloxane, a monocyclic siloxane, a polycyclic siloxane, a polysilsesquioxane, an alkyl trimethoxysilane, a linear silazane, a monocyclic silazane, a polycyclic silazane, a polysilsesquiazane, and a combination of any two or more of these precursors. Preferably, the organosilicon precursor is octamethylcyclotetrasiloxane (OMCTS).

Values of w, x, y, and z are applicable to the empirical composition $Si_wO_xC_yH_z$ throughout this specification. The values of w, x, y, and z used throughout this specification should be understood as ratios or an empirical formula (for example for a coating or layer), rather than as a limit on the number or type of atoms in a molecule. For example, octamethylcyclotetrasiloxane, which has the molecular composition $Si_4O_4C_8H_{24}$, can be described by the following empirical formula, arrived at by dividing each of w, x, y, and z in the molecular formula by 4, the largest common factor: $Si_1O_1C_2H_6$. The values of w, x, y, and z are also not limited to integers. For example, (acyclic) octamethyltrisiloxane, molecular composition $Si_3O_2C_8H_{24}$, is reducible to $Si_1O_{0.67}C_{2.67}H_8$. Also, although $SiO_xC_yH_z$ is described as equivalent to $SiO_xC_y$, it is not necessary to show the presence of hydrogen in any proportion to show the presence of $SiO_xC_y$.

As used in this disclosure, "container closure integrity" or "CCI" refers to the ability of a container closure system, e.g., a container and cap assembly as described herein, to provide protection and maintain effective closure integrity and sterility during the shelf life of a sterile product stored in the container.

As used in this disclosure, "fluid-tight" refers to the ability of a container closure system, e.g., a container and cap assembly as described herein, to prevent the ingress into a sealed container or egress out of a sealed container, of liquid or gas, including air and nitrogen, at temperatures between ambient and the cryogenic temperatures as typically used for storage in liquid nitrogen vapor phase. Optionally, fluid-tightness may be tested by typical CCI testing methods such as Helium Leakage, or Vacuum Decay, or Oxygen Headspace.

Optional Embodiments of Container and Cap Assemblies

Referring now in detail to the various figures of the drawings wherein like reference numerals refer to like parts, there is shown in FIGS. 1 to 5 a container and cap assembly 10 according to an optional aspect of the disclosed concept. The container and cap assembly 10 includes a container body 12, a cap 20 configured for insertion into an opening 22 of the container body 12 and optionally a foil seal 24. The foil seal or an alternative seal may be essential to provide the CCI below −80° C. and at deep cryogenic temperatures including in LNVP.

Figure 5:
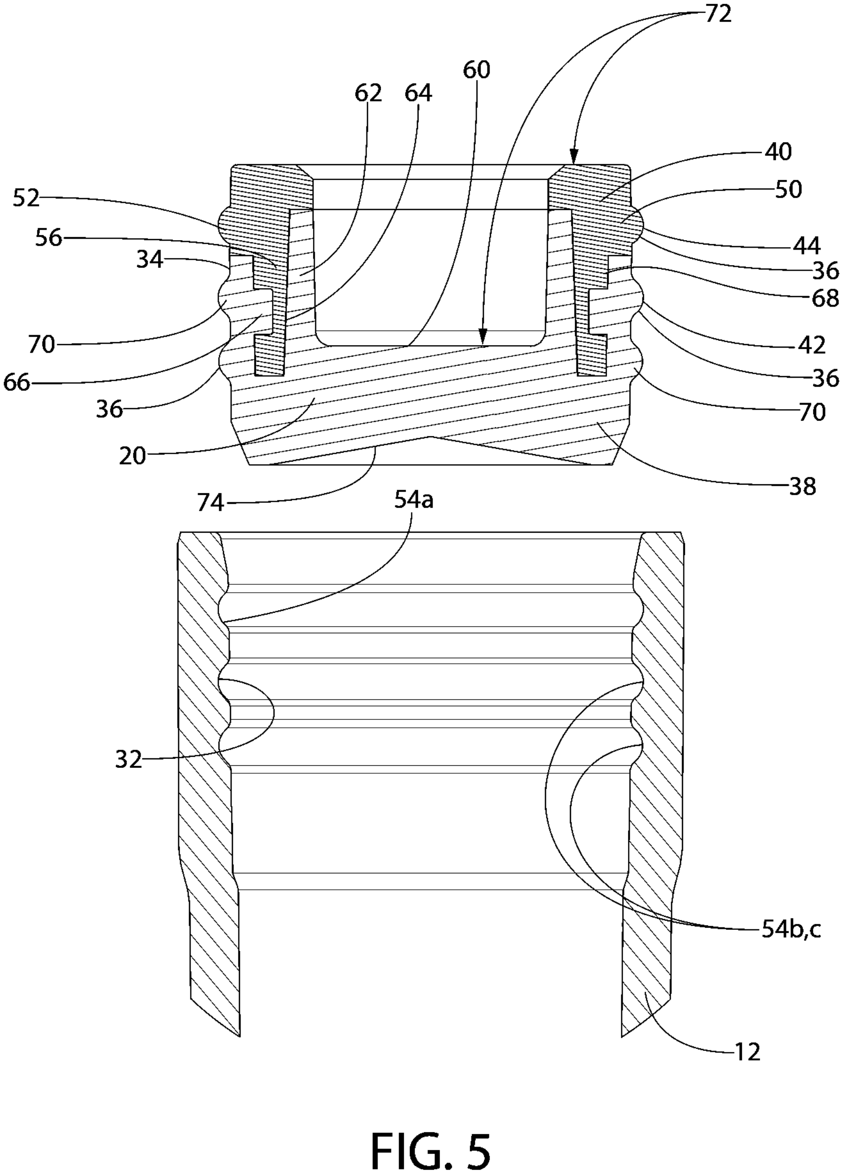
FIG. 5 is an enlarged axial sectional view of a cap positioned above an upper portion of the container prior to insertion of the cap into the opening of the container.
Figure 5A:
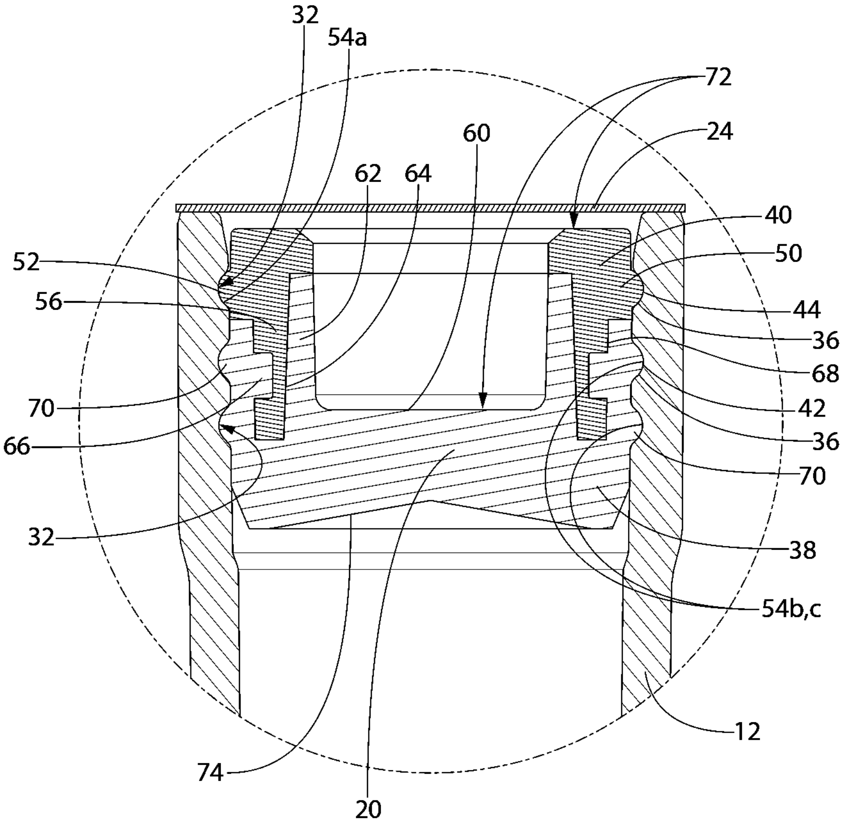
FIG. 5A is an enlarged axial sectional view of an upper portion of the container and cap assembly as shown in FIG. 4.

The container body 12 has a base 26 and a sidewall 28 extending therefrom. The container body 12 defines an interior 30 configured for storing a substance. The opening 22 of the container body 12 leads to the interior 30. As best shown in FIGS. 5 and 5A, the interior 30 comprises a body sealing surface 32, which, as shown, is provided on an inner wall 14 portion of the sidewall 28. However, it is possible in alternative embodiments that a body sealing surface may be provided on another structure (aside from the sidewall) within the interior of the body.

The cap 20, when inserted into the opening 22, provides a fluid-tight closure (at temperatures above approximately −80° C.) between the cap 20 and the container body 12. The cap 20 has an outer surface 34 that comprises a cap sealing surface 36 configured to engage in an interference fit and optionally a snap-fit with the body sealing surface 32 when the cap 20 is inserted into the opening 22. The cap 20 comprises a first section 38 formed of a first material 38*a* adapted to be pierceable by conventional hypodermic needles and a second section 40 formed of a second material 40*a* that is adapted to not be pierceable by conventional hypodermic needles. The first section 38 and the second section 40 together form an assembled unit. The first section 38 forms a first portion 42 of the cap sealing surface 36 and the second section 40 forms a second portion 44 of the cap sealing surface 36.

Optionally, as mentioned above, the container and cap assembly 10 further includes a foil seal 24 disposed over the opening 22. The foil seal 24 operates to fully enclose the cap 20 within the container body 12 beneath the foil seal 24. In this way, the foil seal 24 provides a hermetic closure over the opening 22, thus providing an additional safety factor for the septum in the cap and also ensures container closure integrity and fluid-tightness of the assembly 10 below approximately −80° C. and down to the low cryogenic temperatures of LNVP. The foil seal 24 is optionally heat annealed (e.g., by induction heat and pressure) to an upper surface 46 of the container body 12 surrounding the opening 22.

In the embodiment shown, the body sealing surface 32 and cap sealing surface 36 are generally round. In other embodiments, the sealing surfaces may be of alternative geometries, e.g., elliptical or rectangular, for example.

In the optional embodiment shown, the second section 40 of the cap 20 comprises an annular ring 50. Preferably, the annular ring 50 comprises at least one bead 52 and the body sealing surface 32 comprises at least one groove 54*a*. The bead 52 is configured to engage the groove 54*a* so as to form a snap fit engagement therebetween. The annular ring 50 optionally comprises an axially projecting annular extension 56 having an outer diameter that is less than that of the second portion 44 of the cap sealing surface 36. Optionally, the first section 38 of the cap 20 comprises a central core 60 for piercing with a hypodermic needle in order to withdraw therewith a substance stored within the interior of the container body 12.

Optionally, the first section 38 of the cap 20 comprises an inner portion 62 disposed along an inside 64 of the extension 56 and an outer portion 66 disposed on an outside 68 of the extension 56. The outer portion 66 of the first section 38 comprises at least one bead 70 and the body sealing surface 32 comprises at least one groove 54*b,c*. The bead 70 of the outer portion 66 is configured to engage the groove 54*b,c* of the body sealing surface so as to form a sealing engagement therebetween, optionally an elastomer to plastic or compressive to rigid sealing engagement. Optionally (and as shown), the first section 38 of the cap 20 extends axially beyond the axially projecting annular extension 56. Optionally, the cap 20 comprises a top portion 72 that includes both the first section 38 and the second section 40. The cap 20 comprises a bottom portion 74 that consists only of the first section 38 (i.e., not the second section).

Optionally, the container body 12 and/or the second section 40 of the cap 20 according to any embodiment of the disclosed concept may be made from one or more injection moldable thermoplastic resins including, but not limited to: an olefin polymer; polypropylene (PP); polyethylene (PE); cyclic olefin copolymer (COC); cyclic olefin polymer (COP); polymethylpentene; polyester; polyethylene terephthalate; polyethylene naphthalate; polybutylene terephthalate (PBT); PVdC (polyvinylidene chloride); polyvinyl chloride (PVC); polycarbonate; polymethylmethacrylate; polylactic acid; polystyrene; hydrogenated polystyrene; poly (cyclohexylethylene) (PCHE); nylon; polyurethane polyacrylonitrile; polyacrylonitrile (PAN); an ionomeric resin; Surlyn® ionomeric resin. For applications in which clear and glass-like polymers are desired, a cyclic olefin polymer (COP), cyclic olefin copolymer (COC) or polycarbonate may be preferred. Such materials may be manufactured, e.g., by injection molding or injection stretch blow molding, to very tight and precise tolerances.

Optionally, the first section 38 of the cap 20 according to any embodiment of the disclosed concept may be an elastomeric material, optionally selected from the group consisting of: a thermoset rubber (e.g., butyl rubber), a thermoplastic elastomer (TPE), liquid silicone rubber and fluoro-liquid silicone rubber.

Optionally, the cap may be made through two-shot injection molding, wherein a first material shot injects the first material within a mold and the second material shot injects the second material within the mold. The order of the shots in the molding process can be one way or the other. Such a method advantageously avoids the need for assembling separate components to make the cap. If a two-shot molding process is used, the materials must be compatible to enable the first material (e.g., elastomer) and second material (e.g., thermoplastic resin) to bond together, thus forming the assembled unit as a unitary structure upon cooling of the assembled unit. For example, if the first material is a polyolefin based thermoplastic elastomer, the second material is preferably a polyolefin, such as PP, COP or COC.

The container and cap assembly 10 is operative such that when the cap 20 is inserted into the opening 22 so as to provide a fluid-tight closure between the cap 20 and the container body 12, the first portion of the cap sealing surface provides a sealing engagement with the body sealing surface and the second portion of the cap sealing surface provides a snap-fit engagement with the body sealing surface. While aspects of the disclosed concept relate to the container and cap assembly 10 when empty, in another aspect, the assembly 10 may include a bioactive substance stored therein, optionally cell material or a vaccine.

It should be noted that the cap 20 solely engages the container body 12 within the interior of the container body 12. In other words, the cap 20 does not include a component that engages an outer portion of the container body. Moreover, preferably no portion of the cap 20 protrudes above the opening 22 of the container body 12 when the cap 20 is fully inserted within the body 12 to enclose and seal contents within.

Figure 6:
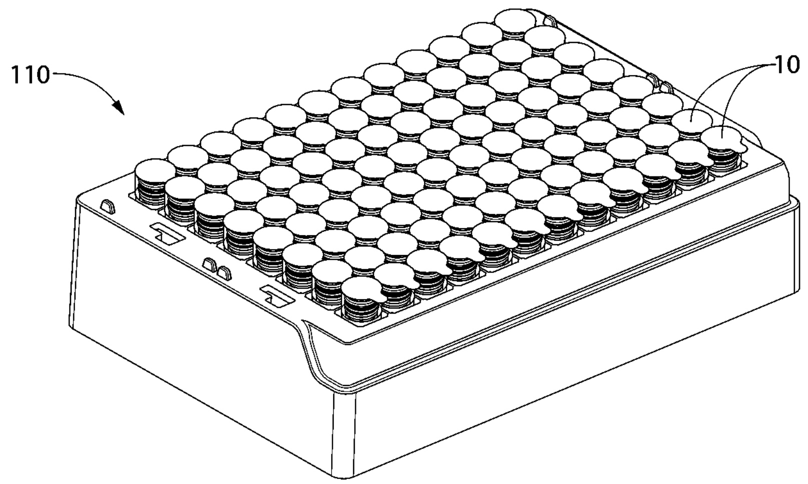
FIG. 6 is an isometric view of a tray retaining a plurality of sealed container assemblies according to FIG. 1.

Optionally, as shown in FIG. 6, a plurality of assemblies 10 such as disclosed herein may be retained in a tray 110. The tray 110 as shown is without a lid, however a lid may optionally be included. In at least one embodiment, the tray may include locking features to retain the containers in the desirable position during assembly, sterilization, filling, transportation, or other manufacturing or operational steps. In one example, the locking features may retain the containers in the appropriate position to ensure effective and reproducible sealing of foil seal 24 over opening 22. The locking features thus provide a means to ensure that the containers are properly seated in the tray 110 so that they may be sealed with foil seal 24. The foil seal 24 operates to fully enclose the cap 20 within the container body 12 beneath the foil seal 24. Additionally, once an effective seal has been made between the container body 12 and foil seal 24, the locking features may be used to keep the sealed containers from banging into the tray lid if the tray is turned upside down for inspection or other processing. Such banging or contact between the foil seal 24 and the tray lid may damage the foil seal 24 and container closure integrity, so the locking features may be employed to prevent such interaction and assist in maintaining CCI.

PECVD-Coated Container Body

In the primary embodiment shown, the container body 12 is preferably constructed of a thermoplastic resin and may not include any coatings or layers on the inner wall thereof.

In another optional aspect of the disclosed concept, the container body 12 may include a PECVD coating or PECVD coating set. It may be desired to provide one or more coatings or layers to the inner wall 14 of the container body 12 to modify the properties of the container body 12. For example, one or more coatings or layers may be added to the inner wall 14, e.g., to improve the barrier properties of the container body 12 and/or prevent interaction between the inner wall 14 (or an underlying coating) and a substance stored in the interior. Such coatings or layers may be constructed in accordance with the teachings of PCT Application PCT/US2014/023813, filed on Mar. 11, 2014, which is incorporated by reference herein in its entirety.

Figure 4:
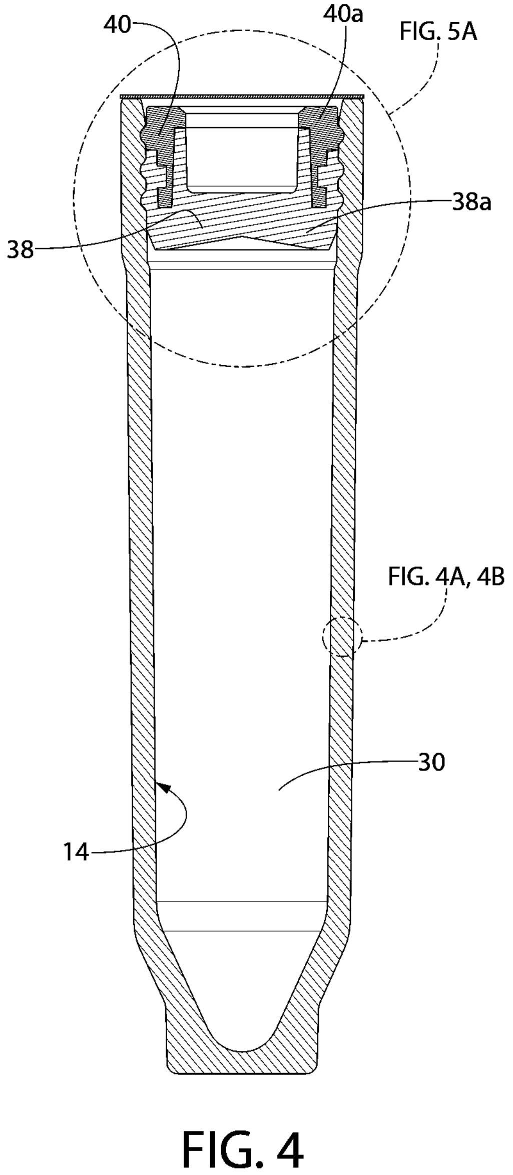
FIG. 4 is an axial sectional view of the sealed container of FIG. 1.
Figure 4A:
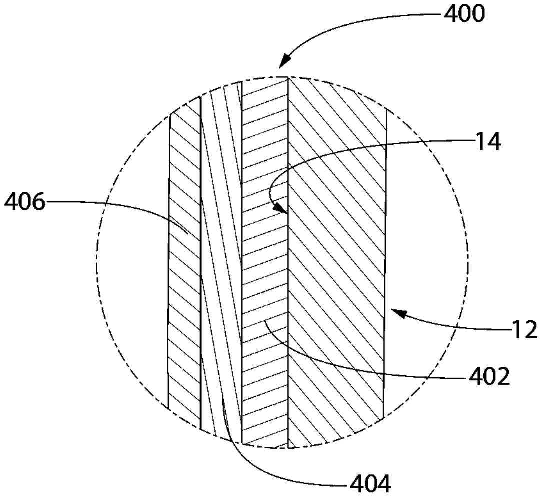
FIG. 4A is an enlarged sectional view of a first alternative embodiment of the inner surface of the container assembly of FIG. 1, comprising a tri-layer coating set disposed thereon.
Figure 4B:
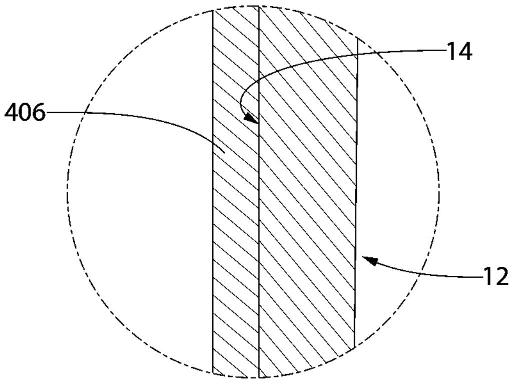
FIG. 4B is an enlarged sectional view of a second alternative embodiment of the inner surface of the container assembly of FIG. 1, comprising an organo-siloxane coating disposed thereon.

For example, as shown in FIG. 4A, which is a first alternative embodiment of an enlarged sectional view of the container body 12 of FIG. 4, the inner wall 14 of the container body 12 may include a coating set 400 comprising one or more coatings or layers. The container body may include at least one tie coating or layer 402, at least one barrier coating or layer 404, and at least one organo-siloxane coating or layer 406. The organo-siloxane coating or layer 406 preferably has pH protective properties. This embodiment of the coating set 400 is referred to herein as a "tri-layer coating set" in which the barrier coating or layer 404 of $SiO_x$ is protected against contents having a pH otherwise high enough to remove it by being sandwiched between the pH protective organo-siloxane coating or layer 406 and the tie coating or layer 402. The contemplated thicknesses of the respective layers in nanometers (preferred ranges in parentheses) are given in the following Tri-layer Thickness Table:

Tri-layer Thickness Table

| Adhesion (nm) | Barrier (nm) | Protection (nm) |
|---|---|---|
| 5-100<br>(5-20) | 20-200<br>(20-30) | 50-500<br>(100-200) |

Properties and compositions of each of the coatings that make up the tri-layer coating set are now described.

The tie coating or layer 402 has at least two functions. One function of the tie coating or layer 402 is to improve adhesion of a barrier coating or layer 404 to a substrate (e.g., the inner wall 14 of the container body 12), in particular a thermoplastic substrate. For example, a tie coating or layer, also referred to as an adhesion layer or coating can be applied to the substrate and the barrier layer can be applied to the adhesion layer to improve adhesion of the barrier layer or coating to the substrate.

Another function of the tie coating or layer 402 has been discovered: a tie coating or layer 402 applied under a barrier coating or layer 404 can improve the function of a pH protective organo-siloxane coating or layer 406 applied over the barrier coating or layer 404.

The tie coating or layer 402 can be composed of, comprise, or consist essentially of $SiO_xC_y$, in which x is between 0.5 and 2.4 and y is between 0.6 and 3. Alternatively, the atomic ratio can be expressed as the formula $Si_wO_xC_y$. The atomic ratios of Si, O, and C in the tie coating or layer 402 are, as several options:

Si 100: O 50-150: C 90-200 (i.e. w=1, x=0.5 to 1.5, y=0.9 to 2);

Si 100: O 70-130: C 90-200 (i.e. w=1, x=0.7 to 1.3, y=0.9 to 2)

Si 100: O 80-120: C 90-150 (i.e. w=1, x=0.8 to 1.2, y=0.9 to 1.5)

Si 100: O 90-120: C 90-140 (i.e. w=1, x=0.9 to 1.2, y=0.9 to 1.4), or

Si 100: O 92-107: C 116-133 (i.e. w=1, x=0.92 to 1.07, y=1.16 to 1.33).

The atomic ratio can be determined by XPS. Taking into account the H atoms, which are not measured by XPS, the tie coating or layer 402 may thus in one aspect have the formula $Si_wO_xC_yH_z$ (or its equivalent $S_tO_xC_y$), for example where w is 1, x is from about 0.5 to about 2.4, y is from about 0.6 to about 3, and z is from about 2 to about 9. Typically, a tie coating or layer 402 would hence contain 36% to 41% carbon normalized to 100% carbon plus oxygen plus silicon.

The barrier coating or layer 404 for any embodiment defined in this specification (unless otherwise specified in a particular instance) is a coating or layer, optionally applied by PECVD as indicated in U.S. Pat. No. 7,985,188, which is incorporated herein by reference in its entirety. The barrier coating preferably is characterized as a "$SiO_x$" coating, and contains silicon, oxygen, and optionally other elements, in which x, the ratio of oxygen to silicon atoms, is from about 1.5 to about 2.9. The thickness of the $SiO_x$ or other barrier coating or layer can be measured, for example, by transmission electron microscopy (TEM), and its composition can be measured by X-ray photoelectron spectroscopy (XPS). The barrier layer is effective to prevent oxygen, carbon dioxide, or other gases from entering the container and/or to prevent leaching of the pharmaceutical material into or through the container wall.

Preferred methods of applying the barrier 404 layer and tie layer 402 to the inner wall 14 of the container body 12 is by plasma enhanced chemical vapor deposition (PECVD), such as described in, e.g., U.S. Pat. App. Pub. No. 20130291632, which is incorporated by reference herein in its entirety.

The Applicant has found that barrier layers or coatings of $SiO_x$ are eroded or dissolved by some fluids, for example aqueous compositions having a pH above about 5. Since coatings applied by chemical vapor deposition can be very thin—tens to hundreds of nanometers thick—even a relatively slow rate of erosion can remove or reduce the effectiveness of the barrier layer in less time than the desired shelf life of a product package. This is particularly a problem for fluid pharmaceutical compositions, since many of them have a pH of roughly 7, or more broadly in the range of 5 to 9, similar to the pH of blood and other human or animal fluids. The higher the pH of the pharmaceutical preparation, the more quickly it erodes or dissolves the $SiO_x$ coating. Optionally, this problem can be addressed by protecting the barrier coating or layer, or other pH sensitive material, with a pH protective organo-siloxane coating or layer.

Optionally, the pH protective organo-siloxane coating or layer 406 can be composed of, comprise, or consist essentially of $Si_wO_xC_yH_z$ (or its equivalent $SiO_xC_y$) or $Si_wN_xC_yH_z$ or its equivalent $SiN_xC_y$). The atomic ratio of Si:O:C or Si:N:C can be determined by XPS (X-ray photoelectron spectroscopy). Taking into account the H atoms, the pH protective coating or layer may thus in one aspect have the formula $Si_wO_xC_yH_z$, or its equivalent $SiO_xC_y$, for example where w is 1, x is from about 0.5 to about 2.4, y is from about 0.6 to about 3, and z is from about 2 to about 9.

Typically, expressed as the formula $Si_wO_wC_y$, the atomic ratios of Si, O, and C are, as several options:

Si 100: O 50-150: C 90-200 (i.e. w=1, x=0.5 to 1.5, y=0.9 to 2);

Si 100: O 70-130: C 90-200 (i.e. w=1, x=0.7 to 1.3, y=0.9 to 2)

Si 100: O 80-120: C 90-150 (i.e. w=1, x=0.8 to 1.2, y=0.9 to 1.5)

Si 100: O 90-120: C 90-140 (i.e. w=1, x=0.9 to 1.2, y=0.9 to 1.4)

Si 100: O 92-107: C 116-133 (i.e. w=1, x=0.92 to 1.07, y=1.16 to 1.33), or

Si 100: O 80-130: C 90-150.

Alternatively, the organo-siloxane coating or layer can have atomic concentrations normalized to 100% carbon, oxygen, and silicon, as determined by X-ray photoelectron spectroscopy (XPS) of less than 50% carbon and more than 25% silicon. Alternatively, the atomic concentrations are from 25 to 45% carbon, 25 to 65% silicon, and 10 to 35% oxygen. Alternatively, the atomic concentrations are from 30 to 40% carbon, 32 to 52% silicon, and 20 to 27% oxygen. Alternatively, the atomic concentrations are from 33 to 37% carbon, 37 to 47% silicon, and 22 to 26% oxygen.

Optionally, the atomic concentration of carbon in the pH protective coating or layer 406, normalized to 100% of carbon, oxygen, and silicon, as determined by X-ray photoelectron spectroscopy (XPS), can be greater than the atomic concentration of carbon in the atomic formula for the organosilicon precursor. For example, embodiments are contemplated in which the atomic concentration of carbon increases by from 1 to 80 atomic percent, alternatively from 10 to 70 atomic percent, alternatively from 20 to 60 atomic percent, alternatively from 30 to 50 atomic percent, alternatively from 35 to 45 atomic percent, alternatively from 37 to 41 atomic percent.

Optionally, the atomic ratio of carbon to oxygen in the pH protective coating or layer 406 can be increased in comparison to the organosilicon precursor, and/or the atomic ratio of oxygen to silicon can be decreased in comparison to the organosilicon precursor.

An exemplary empirical composition for a pH protective coating is $SiO_{1.3}C_{0.8}H_{3.6}$.

Optionally in any embodiment, the pH protective coating or layer 406 comprises, consists essentially of, or consists of PECVD applied silicon carbide.

Optionally in any embodiment, the pH protective coating or layer 406 is applied by employing a precursor comprising, consisting essentially of, or consisting of a silane. Optionally in any embodiment, the silane precursor comprises, consists essentially of, or consists of any one or more of an acyclic or cyclic silane, optionally comprising, consisting essentially of, or consisting of any one or more of silane, trimethylsilane, tetramethylsilane, Si2-Si4 silanes, triethyl silane, tetraethyl silane, tetrapropylsilane, tetrabutylsilane, or octamethylcyclotetrasilane, or tetramethylcyclotetrasilane.

Optionally in any embodiment, the pH protective coating or layer 406 comprises, consists essentially of, or consists of PECVD applied amorphous or diamond-like carbon. Optionally in any embodiment, the amorphous or diamond-like carbon is applied using a hydrocarbon precursor. Optionally in any embodiment, the hydrocarbon precursor comprises, consists essentially of, or consists of a linear, branched, or cyclic alkane, alkene, alkadiene, or alkyne that is saturated or unsaturated, for example acetylene, methane, ethane, ethylene, propane, propylene, n-butane, i-butane, butane, propyne, butyne, cyclopropane, cyclobutane, cyclohexane, cyclohexene, cyclopentadiene, or a combination of two or more of these. Optionally in any embodiment, the amorphous or diamond-like carbon coating has a hydrogen atomic percent of from 0.1% to 40%, alternatively from 0.5% to 10%, alternatively from 1% to 2%, alternatively from 1.1 to 1.8%.

Optionally in any embodiment, the pH protective coating or layer 406 comprises, consists essentially of, or consists of PECVD applied SiNb. Optionally in any embodiment, the PECVD applied SiNb is applied using a silane and a nitrogen-containing compound as precursors. Optionally in any embodiment, the silane is an acyclic or cyclic silane, optionally comprising, consisting essentially of, or consisting of silane, trimethylsilane, tetramethylsilane, Si2-Si4 silanes, triethylsilane, tetraethylsilane, tetrapropylsilane, tetrabutylsilane, octamethylcyclotetrasilane, or a combination of two or more of these. Optionally in any embodiment, the nitrogen-containing compound comprises, consists essentially of, or consists of any one or more of: nitrogen gas, nitrous oxide, ammonia or a silazane. Optionally in any embodiment, the silazane comprises, consists essentially of, or consists of a linear silazane, for example hexamethylene disilazane (HMDZ), a monocyclic silazane, a polycyclic silazane, a polysilsesquiazane, or a combination of two or more of these.

Optionally in any embodiment, the PECVD for the pH protective coating or layer 406 is carried out in the substantial absence or complete absence of an oxidizing gas. Optionally in any embodiment, the PECVD for the pH protective coating or layer 406 is carried out in the substantial absence or complete absence of a carrier gas.

Optionally an FTIR absorbance spectrum of the pH protective coating or layer 406 SiOxCyHz has a ratio greater than 0.75 between the maximum amplitude of the Si—O—Si symmetrical stretch peak normally located between about 1000 and 1040 cm−1, and the maximum amplitude of the Si—O—Si asymmetric stretch peak normally located between about 1060 and about 1100 cm−1. Alternatively in any embodiment, this ratio can be at least 0.8, or at least 0.9, or at least 1.0, or at least 1.1, or at least 1.2. Alternatively in any embodiment, this ratio can be at most 1.7, or at most 1.6, or at most 1.5, or at most 1.4, or at most 1.3. Any minimum ratio stated here can be combined with any maximum ratio stated here, as an alternative embodiment.

Optionally, in any embodiment the pH protective coating or layer 406, in the absence of the medicament, has a non-oily appearance. This appearance has been observed in some instances to distinguish an effective pH protective coating or layer 406 from a lubricity layer (e.g., as described in U.S. Pat. No. 7,985,188), which in some instances has been observed to have an oily (i.e. shiny) appearance.

The pH protective coating or layer optionally can be applied by plasma enhanced chemical vapor deposition (PECVD) of a precursor feed comprising an acyclic siloxane, a monocyclic siloxane, a polycyclic siloxane, a polysilsesquioxane, a monocyclic silazane, a polycyclic silazane, a polysilsesquiazane, a silatrane, a silquasilatrane, a silproatrane, an azasilatrane, an azasilquasiatrane, an azasilproatrane, or a combination of any two or more of these precursors. Some particular, non-limiting precursors contemplated for such use include octamethylcyclotetrasiloxane (OMCTS).

Optionally, an FTIR absorbance spectrum of the pH protective coating or layer 406 of composition SiOxCyHz has a ratio greater than 0.75 between the maximum amplitude of the Si—O—Si symmetrical stretch peak between about 1000 and 1040 cm−1, and the maximum amplitude of the Si—O—Si asymmetric stretch peak between about 1060 and about 1100 cm−1.

Other precursors and methods can be used to apply the pH protective coating or layer 406 or passivating treatment. For example, hexamethylene disilazane (HMDZ) can be used as the precursor. HMDZ has the advantage of containing no oxygen in its molecular structure. This passivation treatment is contemplated to be a surface treatment of the SiOx barrier layer with HMDZ. To slow down and/or eliminate the decomposition of the silicon dioxide coatings at silanol bonding sites, the coating must be passivated. It is contemplated that passivation of the surface with HMDZ (and optionally application of a few mono layers of the HMDZ-derived coating) will result in a toughening of the surface against dissolution, resulting in reduced decomposition. It is contemplated that HMDZ will react with the —OH sites that are present in the silicon dioxide coating, resulting in the evolution of NH3 and bonding of S—(CH3)3 to the silicon (it is contemplated that hydrogen atoms will be evolved and bond with nitrogen from the HMDZ to produce NH3).

Another way of applying the pH protective coating or layer is to apply as the pH protective coating or layer an amorphous carbon or fluorocarbon coating, or a combination of the two.

Amorphous carbon coatings can be formed by PECVD using a saturated hydrocarbon, (e.g. methane or propane) or an unsaturated hydrocarbon (e.g. ethylene, acetylene) as a precursor for plasma polymerization. Fluorocarbon coatings can be derived from fluorocarbons (for example, hexafluoroethylene or tetrafluoroethylene). Either type of coating, or a combination of both, can be deposited by vacuum PECVD or atmospheric pressure PECVD. It is contemplated that that an amorphous carbon and/or fluorocarbon coating will provide better passivation of an SiOx barrier layer than a siloxane coating since an amorphous carbon and/or fluorocarbon coating will not contain silanol bonds.

It is further contemplated that fluorosilicon precursors can be used to provide a pH protective coating or layer over a SiOx barrier layer. This can be carried out by using as a precursor a fluorinated silane precursor such as hexafluorosilane and a PECVD process. The resulting coating would also be expected to be a non-wetting coating.

Yet another coating modality contemplated for protecting or passivating a SiOx barrier layer is coating the barrier layer using a polyamidoamine epichlorohydrin resin. For example, the barrier coated part can be dip coated in a fluid polyamidoamine epichlorohydrin resin melt, solution or dispersion and cured by autoclaving or other heating at a temperature between 60 and 100° C. It is contemplated that a coating of polyamidoamine epichlorohydrin resin can be preferentially used in aqueous environments between pH 5-8, as such resins are known to provide high wet strength in paper in that pH range. Wet strength is the ability to maintain mechanical strength of paper subjected to complete water soaking for extended periods of time, so it is contemplated that a coating of polyamidoamine epichlorohydrin resin on a SiOx barrier layer will have similar resistance to dissolution in aqueous media. It is also contemplated that, because polyamidoamine epichlorohydrin resin imparts a lubricity improvement to paper, it will also provide lubricity in the form of a coating on a thermoplastic surface made of, for example, COC or COP.

Even another approach for protecting a SiOx layer is to apply as a pH protective coating or layer a liquid-applied coating of a polyfluoroalkyl ether, followed by atmospheric plasma curing the pH protective coating or layer. For example, it is contemplated that the process practiced under the trademark TriboGlide® can be used to provide a pH protective coating or layer 406.

Thus, a pH protective coating for a thermoplastic container body wall according to an aspect of the disclosed concept may comprise, consist essentially of, or consist of any one of the following: plasma enhanced chemical vapor deposition (PECVD) applied silicon carbide having the formula $SiO_xC_yH_z$, in which x is from 0 to 0.5, alternatively from 0 to 0.49, alternatively from 0 to 0.25 as measured by X ray photoelectron spectroscopy (XPS), y is from about 0.5 to about 1.5, alternatively from about 0.8 to about 1.2, alternatively about 1, as measured by XPS, and z is from 0 to 2 as measured by Rutherford Backscattering Spectrometry (RBS), alternatively by Hydrogen Forward Scattering Spectrometry (HFS); or PECVD applied amorphous or diamond-like carbon, $CH_z$, in which z is from 0 to 0.7, alternatively from 0.005 to 0.1, alternatively from 0.01 to 0.02; or PECVD applied $SiN_b$, in which b is from about 0.5 to about 2.1, alternatively from about 0.9 to about 1.6, alternatively from about 1.2 to about 1.4, as measured by XPS.

PECVD apparatus suitable for applying any of the PECVD coatings or layers described in this specification, including the tie coating or layer, the barrier coating or layer or the organo-siloxane coating or layer, is shown and described in U.S. Pat. No. 7,985,188 and U.S. Pat. App. Pub. No. 20130291632. This apparatus optionally includes a vessel holder, an inner electrode, an outer electrode, and a power supply. A vessel seated on the vessel holder defines a plasma reaction chamber, optionally serving as its own vacuum chamber. Optionally, a source of vacuum, a reactant gas source, a gas feed or a combination of two or more of these can be supplied. Optionally, a gas drain, not necessarily including a source of vacuum, is provided to transfer gas to or from the interior of a vessel seated on the port to define a closed chamber.

The organo-siloxane coating can optionally provide multiple functions: (1) a pH resistant layer that protects an underlying layer or underlying polymer substrate from drug products having a pH from 4-10, optionally from 5-9; (2) a drug contact surface that minimizes aggregation, extractables and leaching; and (3) in the case of a protein-based drug, reduced protein binding on the container body surface.

While the invention has been described in detail and with reference to specific examples thereof, it will be apparent to one skilled in the art that various changes and modifications can be made therein without departing from the spirit and scope thereof.

What is claimed is:

1. A method for the cryogenic preservation of biologically active materials, the method comprising: storing a biologically active material in a sealed container and cap assembly in cryogenic conditions at temperatures below −150° C., the container and cap assembly comprising:

a. a container body having a base and a sidewall extending therefrom, the container body defining an interior configured for storing a substance, the container body further having an opening leading to the interior, the interior comprising a body sealing surface that is provided on an interior portion of the sidewall; and b. a cap configured for insertion into the opening so as to provide fluid-tight closure between the cap and the container body, the cap having an outer surface that comprises a cap sealing surface configured to engage in an interference fit and a snap-fit with the body sealing surface when the cap is inserted into the opening, the cap comprising a first section formed of a first material adapted to be pierceable by conventional hypodermic needles and a second section formed of a second material that is adapted to not be pierceable by conventional hypodermic needles, the first section and the second section together forming an assembled unit, wherein the first section forms a first portion of the cap sealing surface and the second section forms a second portion of the cap sealing surface, the second section comprising an annular ring that comprises at least one bead, the body sealing surface comprising at least one groove, the at least one bead of the annular ring being configured to engage the at least one groove of the body sealing surface so as to form a snap-fit engagement therebetween.

2. The method of claim 1, wherein the body sealing surface and cap sealing surface are generally round.

3. The method of claim 1, wherein the first material is elastomeric.

4. The method of claim 3, wherein the second material is made from an injection moldable thermoplastic resin.

5. The method of claim 4, wherein the cap is made through a two-shot injection molding process, wherein a first material shot injects the first material within a mold and a second material shot injects the second material within the mold to form the assembled unit as a unitary structure upon cooling of the assembled unit.

6. The method of claim 1, the assembly further comprising a foil seal disposed over the opening, fully enclosing the cap within the container body beneath the foil seal, the foil seal providing a hermetic closure over the opening.

7. The method of claim 6, wherein the foil seal is heat annealed to an upper surface of the container body surrounding the opening.

8. The method of claim 1, wherein the annular ring comprises an axially projecting annular extension having an outer diameter that is less than that of the second portion of the cap sealing surface.

9. The method of claim 8, the first section comprising a central core for piercing with a hypodermic needle in order to withdraw therewith a substance stored within the interior of the container body.

10. The method of claim 9, the first section comprising an inner portion disposed along an inside of the extension and an outer portion disposed on an outside of the extension.

11. The method of claim 10, wherein the outer portion of the first section comprises the at least one bead, the at least one bead of the outer portion configured to engage the at least one groove of the body sealing surface so as to form a sealing engagement therebetween.

12. The method of claim 8, wherein the first section extends axially beyond the axially projecting annular extension.

13. The method of claim 1, the cap comprising a top portion that includes the first section and the second section, the cap comprising a bottom portion that consists only of the first section.

14. The method of claim 1, wherein the cap is inserted into the opening so as to provide a fluid-tight closure between the cap and the container body, the first portion of the cap sealing surface providing a sealing engagement with the body sealing surface, the second portion of the cap sealing surface providing the snap-fit engagement with the body sealing surface.

15. The method of claim 1, wherein the biologically active material is stored within the interior of the body.

16. The method of claim 1, wherein the cap does not include a component that engages an outer portion of the container body.

17. The method of claim 1, wherein the container body is made from one or more injection moldable thermoplastic resins selected from the group consisting of: an olefin polymer; polypropylene (PP); polyethylene (PE); cyclic olefin copolymer (COC); cyclic olefin polymer (COP); polymethylpentene; polyester; polyethylene terephthalate; polyethylene naphthalate; polybutylene terephthalate (PBT); PVdC (polyvinylidene chloride); polyvinyl chloride (PVC); polycarbonate; polymethylmethacrylate; polylactic acid; polystyrene; hydrogenated polystyrene; poly(cyclohexylethylene) (PCHE); nylon; polyurethane polyacrylonitrile; polyacrylonitrile (PAN); an ionomeric resin; and Surlyn® ionomeric resin.

18. The method of claim 1, wherein the biologically active material is stored within the interior of the body, wherein the biologically active material is cellular material or a vaccine, wherein the container and cap assembly maintain container closure integrity (CCI) and fluid-tight closure in cryogenic conditions at temperatures below −150° C.

19. The method of claim 1, the sidewall having an interior wall having at least one plasma enhanced chemical deposition (PECVD) coating.

20. The method of claim 19, wherein the PECVD coating is selected from the group consisting of:

a. a single layer, comprising an organo-siloxane layer disposed on the interior wall; and b. a tri-layer coating, comprising a tie layer disposed on the interior wall, an SiOx barrier layer disposed on the tie layer and an organo-siloxane layer disposed on the SiOx barrier layer.

* * * * *